US012023796B2

(12) United States Patent
Liu

(10) Patent No.: US 12,023,796 B2
(45) Date of Patent: Jul. 2, 2024

(54) TOOL BOX ASSEMBLY

(71) Applicant: Ningbo King Mount Co., Ltd., Ningbo (CN)

(72) Inventor: Kuan-Ting Liu, Taichung (TW)

(73) Assignee: NINGBO KING MOUNT CO., LTD., Ningbo (CN)

( * ) Notice: Subject to any disclaimer, the term of this patent is extended or adjusted under 35 U.S.C. 154(b) by 61 days.

(21) Appl. No.: 17/967,038

(22) Filed: Oct. 17, 2022

(65) Prior Publication Data

US 2024/0123602 A1 Apr. 18, 2024

(51) Int. Cl.
*B25H 3/00* (2006.01)

(52) U.S. Cl.
CPC .................................... *B25H 3/003* (2013.01)

(58) Field of Classification Search
CPC ...................................................... B25H 3/003
See application file for complete search history.

(56) References Cited

U.S. PATENT DOCUMENTS 5,570,784 A 11/1996 Sidabras et al.
6,450,338 B1 * 9/2002 Chen ...................... B25H 3/003 206/378
6,698,600 B1 * 3/2004 Lee ........................ B25H 3/003 206/378
D496,844 S * 10/2004 Winig .............................. D8/71
7,188,726 B2 * 3/2007 Lin ........................ B25H 3/003 206/743
7,931,143 B1 * 4/2011 Lin ........................ B25H 3/021 220/629
11,389,944 B1 * 7/2022 Wang ....................... B25H 3/04
11,453,113 B1 * 9/2022 Hsieh ....................... B25H 3/06
11,759,942 B2 * 9/2023 Hohl ...................... B25H 3/003 206/379
2005/0056560 A1 * 3/2005 Chen ...................... B25H 3/003 206/373
2007/0068836 A1 * 3/2007 Lin ........................ B25H 3/003 206/375
2009/0183607 A1 * 7/2009 Johnson ................. B25H 3/003 206/349

(Continued)

FOREIGN PATENT DOCUMENTS

DE 202015104503 U1 * 11/2015 ............. B25H 3/003
DE 102016209490 A1 * 11/2017 ............. B25H 3/003

(Continued)

*Primary Examiner* — J. Gregory Pickett
*Assistant Examiner* — Abigail Elizabeth Guidry
(74) *Attorney, Agent, or Firm* — Chun-Ming Shih; LANWAY IPR SERVICES

(57) ABSTRACT

A tool box assembly includes at least one case, at least one tool holder mounted in and rotated relative to the at least one case, and multiple hand tools mounted in the at least one tool holder. The at least one case has a first pivot portion and multiple locking elements. Each of the locking elements has a second pivot portion, a connecting portion, and a press portion. The at least one tool holder has a third pivot portion. When the press portion is pressed, each of the locking elements is rotated about the connecting portion, so that the third pivot portion is detached from the second pivot portion, and the at least one tool holder is detached from the at least one case. Thus, the at least one tool holder and the hand tools are used individually.

6 Claims, 13 Drawing Sheets

(56) References Cited

U.S. PATENT DOCUMENTS

| | | | | |
|---|---|---|---|---|
| 2021/0146525 | A1* | 5/2021 | Spaulding, Jr. | B25H 3/02 |
| 2022/0355462 | A1* | 11/2022 | Cho | B25H 3/021 |

FOREIGN PATENT DOCUMENTS

| | | | | | |
|---|---|---|---|---|---|
| DE | 202017105770 | U1 | * | 11/2017 | B25H 3/02 |
| DE | 202021102663 | U1 | * | 9/2021 | B25H 3/04 |
| DE | 202021002628 | U1 | * | 12/2021 | B29C 45/72 |
| JP | 3240231 | U | * | 12/2022 | B25H 3/04 |

* cited by examiner

TOOL BOX ASSEMBLY

BACKGROUND OF THE INVENTION

1. Field of the Invention

The present invention relates to a hand tool accessory and, more particularly, to a tool box assembly.

2. Description of the Related Art

A conventional tool box structure was disclosed in the U.S. Pat. No. 5,570,784, and comprises a tray 12, a base 52, and multiple sockets 50. The tray 12 is provided with multiple recessed openings 28. The base 52 has two ends each provided with a stud 46. The stud 46 is pivotally mounted in one of the recessed openings 28. The sockets 50 are mounted on the base 52. The base 52 and the sockets 50 are rotated in one of the recessed openings 28 about the stud 46. In use, the base 52 is rotated freely in one of the recessed openings 28 about the stud 46. In addition, the base 52 is removed from one of the recessed openings 28 so that the base 52 and the sockets 50 are used individually. However, the stud 46 is not locked by the recessed openings 28 so that the stud 46 is easily detached from one of the recessed openings 28 when the tray 12 is inclined relative to the horizontal plane more than ninety degrees. Thus, the base 52 and the sockets 50 will drop or fall from one of the recessed openings 28 when the tray 12 is opened, thereby causing inconvenience to the user.

BRIEF SUMMARY OF THE INVENTION

In accordance with the present invention, there is provided a tool box assembly comprising at least one case, at least one tool holder mounted in and rotated relative to the at least one case, and multiple hand tools mounted in the at least one tool holder. The at least one case has a first pivot portion and multiple locking elements. Each of the locking elements has a second pivot portion, a connecting portion, and a press portion. The at least one tool holder has a third pivot portion. When the press portion is pressed, each of the locking elements is rotated about the connecting portion, so that the third pivot portion is detached from the second pivot portion, and the at least one tool holder is detached from the at least one case. Thus, the at least one tool holder and the hand tools are used individually.

According to the primary advantage of the present invention, each of the locking elements is provided with a second pivot portion. The at least one tool holder has two sides each of which is provided with a third pivot portion. The third pivot portion is pivotally connected with the second pivot portion so that the at least one tool holder is rotated relative to the locking elements. Thus, the locking elements restrict the at least one tool holder so that the at least one tool holder will not be detached from the receiving space easily.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
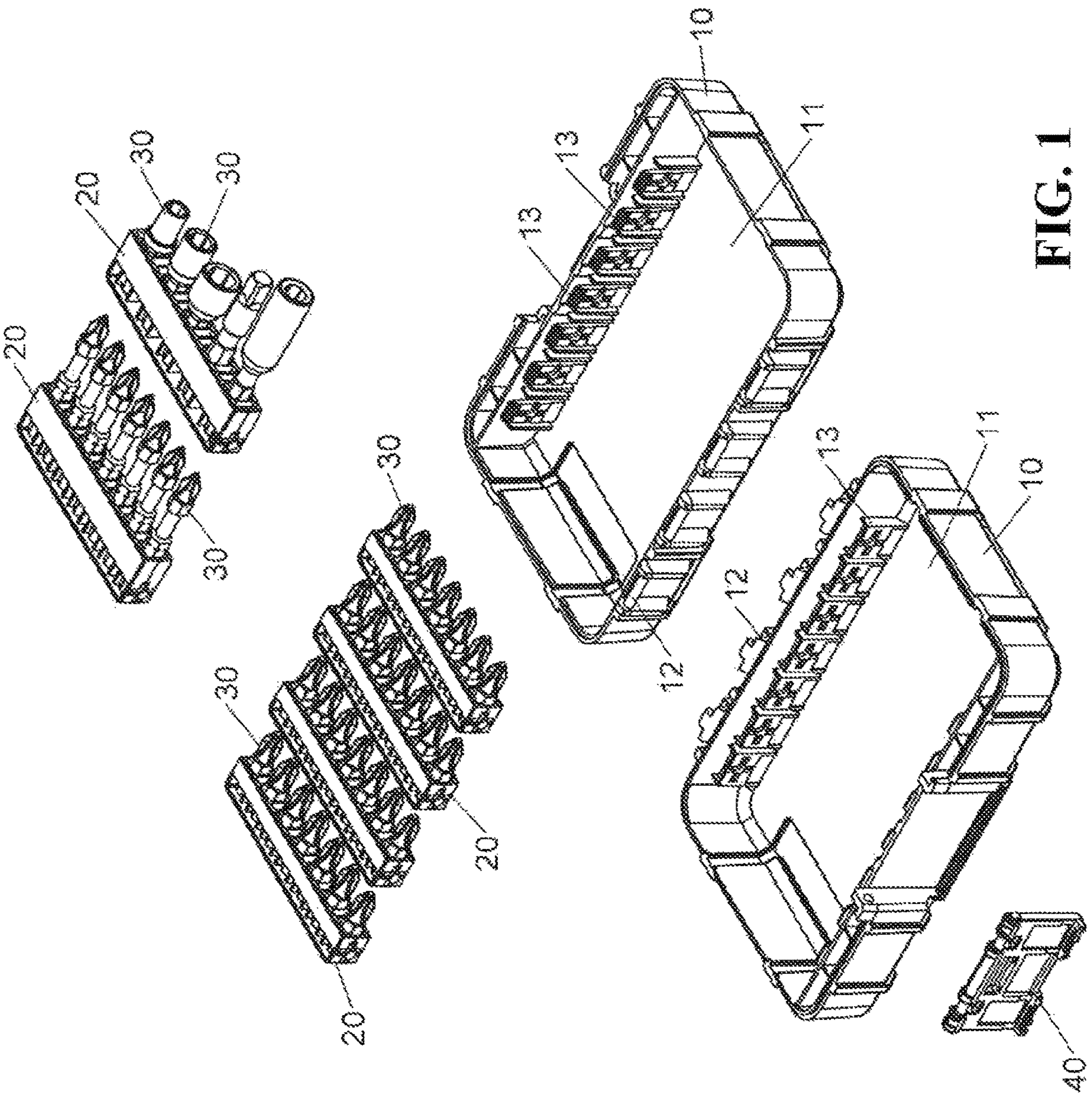
FIG. 1 is an exploded perspective view of a tool box assembly in accordance with the preferred embodiment of the present invention.

Referring to the drawings and initially to FIGS. 1-9, a tool box assembly in accordance with the preferred embodiment of the present invention comprises at least one case (or body or shell or housing) 10, at least one tool holder (or receiving member) 20 mounted in and rotated relative to the at least one case 10, and multiple hand tools 30 mounted in the at least one tool holder 20.

The at least one case 10 has an interior provided with a receiving space 11. The at least one case 10 is provided with a first pivot portion 12. The at least one case 10 is provided with multiple locking elements 13 located at two sides of the receiving space 11. The locking elements 13 at the two sides of the receiving space 11 are arranged symmetrically. The locking elements 13 are arranged linearly in a longitudinal direction of the receiving space 11. Each of the locking elements 13 is provided with a second pivot portion 131. The second pivot portion 131 is arranged at a middle position of each of the locking elements 13. Each of the locking elements 13 is provided with multiple first positioning portions 132. The first positioning portions 132 are arranged annularly about an axis of the second pivot portion 131 of each of the locking elements 13. Each of the locking elements 13 has an L-shaped profile in cross section. Each of the locking elements 13 is provided with a connecting portion 133 connected with the at least one case 10. The connecting portion 133 connects each of the locking elements 13 with the at least one case 10. The connecting portion 133 is arranged at a bottom of the receiving space 11. Each of the locking elements 13 is provided with a press portion 134. The second pivot portion 131 and the first positioning portions 132 are arranged between the press portion 134 and the connecting portion 133. The press portion 134 is distant from the connecting portion 133. A movable space 135 is defined between the press portion 134 and the at least one case 10 to allow movement of the press portion 134 when the press portion 134 is pressed, so that each of the locking elements 13 is deformed and rotated about the connecting portion 133. The movable space 135 has a width more than a length of the second pivot portion 131.

The second pivot portion 131 is a circular hole or a groove. Each of the first positioning portions 132 is a groove. Each of the first positioning portions 132 is connected to the second pivot portion 131. The second pivot portion 131 has a depth more than that of each of the first positioning portions 132. The first positioning portions 132 and the second pivot portion 131 construct a cross-shaped slot when each of the locking elements 13 has four first positioning portions 132.

The at least one tool holder 20 is mounted in the receiving space 11. The at least one tool holder 20 has two sides each of which is provided with a third pivot portion 21. The third pivot portion 21 is pivotally connected with the second pivot portion 131 so that the at least one tool holder 20 is rotated relative to the locking elements 13. Each of the two sides of the at least one tool holder 20 is provided with multiple second positioning portions 22. The second positioning portions 22 are positioned on the first positioning portions 132 so that the at least one tool holder 20 is positioned on the locking elements 13 when the at least one tool holder 20 is rotated relative to the locking elements 13. The second positioning portions 22 are arranged annularly about an axis of the third pivot portion 21 of the at least one tool holder 20. The at least one tool holder 20 is provided with multiple receiving grooves 23.

The third pivot portion 21 is a circular boss or a projection (or lump). Each of the second positioning portions 22 is a projection (or lump). Each of the second positioning portions 22 is connected to the third pivot portion 21. The third pivot portion 21 has a height more than that of each of the second positioning portions 22. The second positioning portions 22 and the third pivot portion 21 construct a cross-shaped projection when each of the two sides of the at least one tool holder 20 has four second positioning portions 22.

The hand tools 30 are mounted in the receiving grooves 23.

Figure 6:
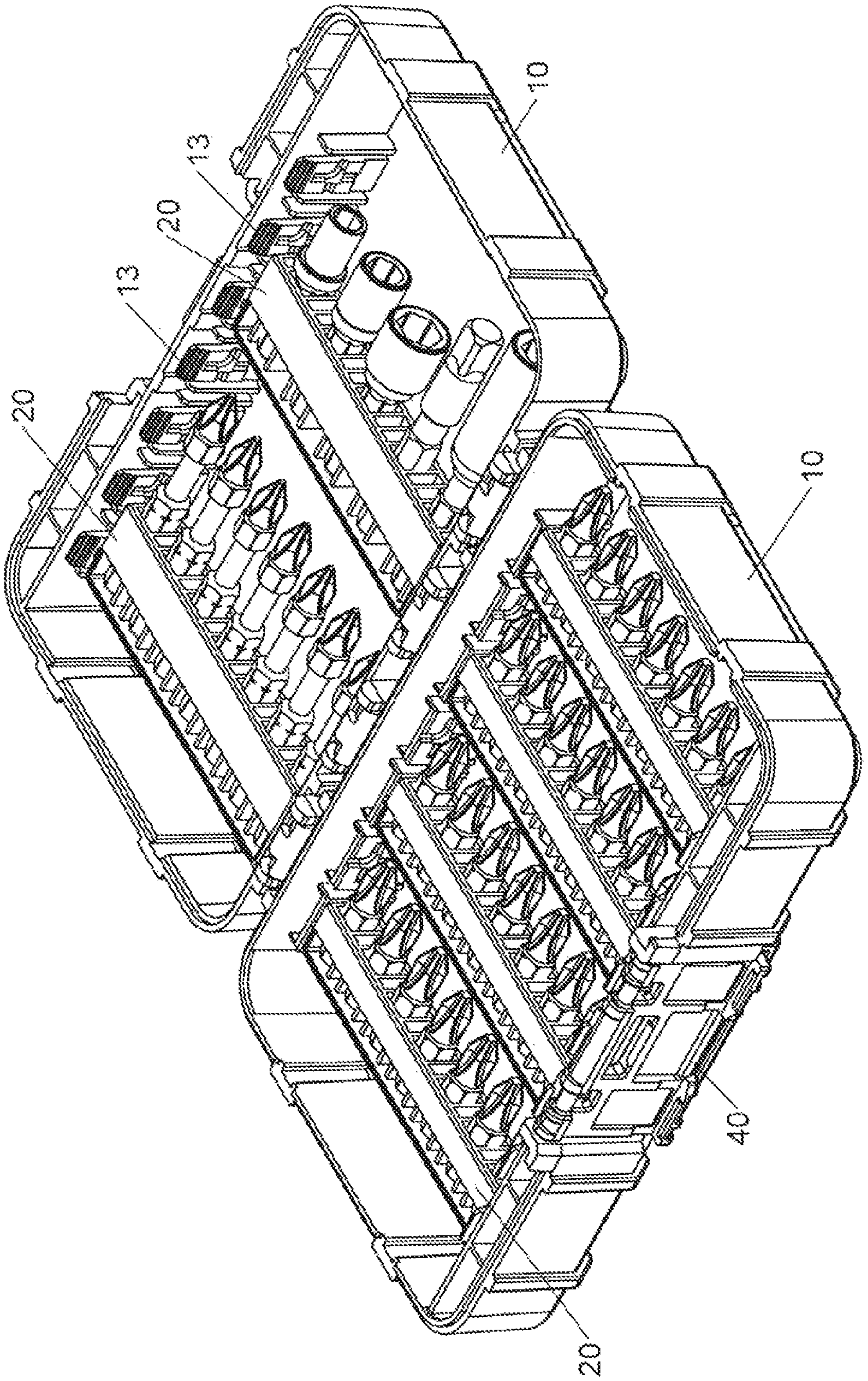
FIG. 6 is a perspective view of the tool box assembly in accordance with the preferred embodiment of the present invention.
Figure 7:
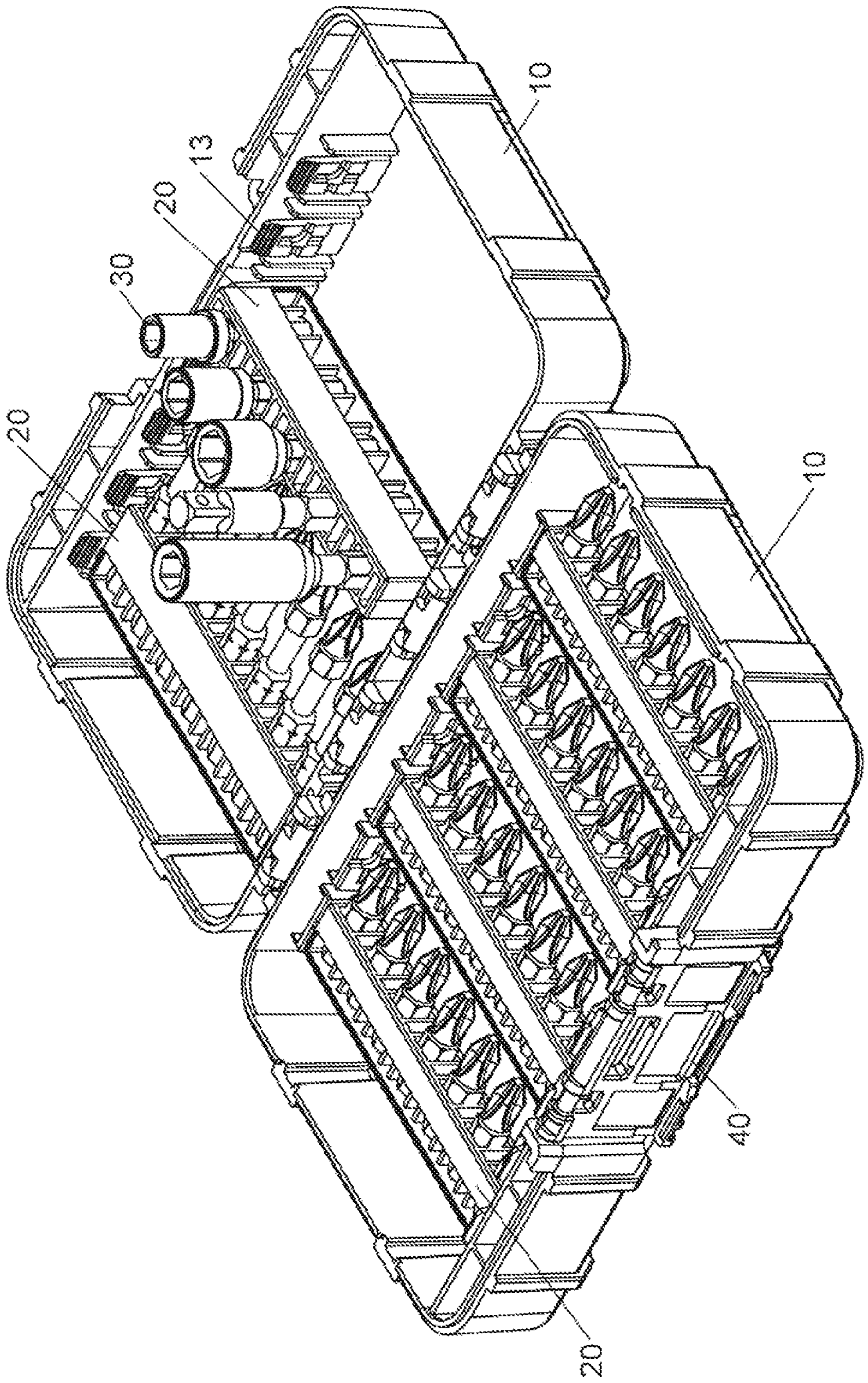
FIG. 7 is a first operational view of the tool box assembly as shown in FIG. 6.

In practice, when the third pivot portion 21 is pivoted relative to the second pivot portion 131, the at least one tool holder 20 is positioned between a first position as shown in FIG. 6 where the receiving grooves 23 are directed toward a face of the receiving space 11, and the hand tools 30 are arranged transversely in the receiving space 11, so that the at least one tool holder 20 and the hand tools 30 are stored in the receiving space 11 of the at least one case 10, and a second position as shown in FIG. 7 where the receiving grooves 23 are directed toward an opening of the receiving space 11, and the hand tools 30 are arranged upright in the receiving space 11, so that the hand tools 30 protrude from the at least one case 10 to facilitate the user taking out the hand tools 30.

Figure 8:
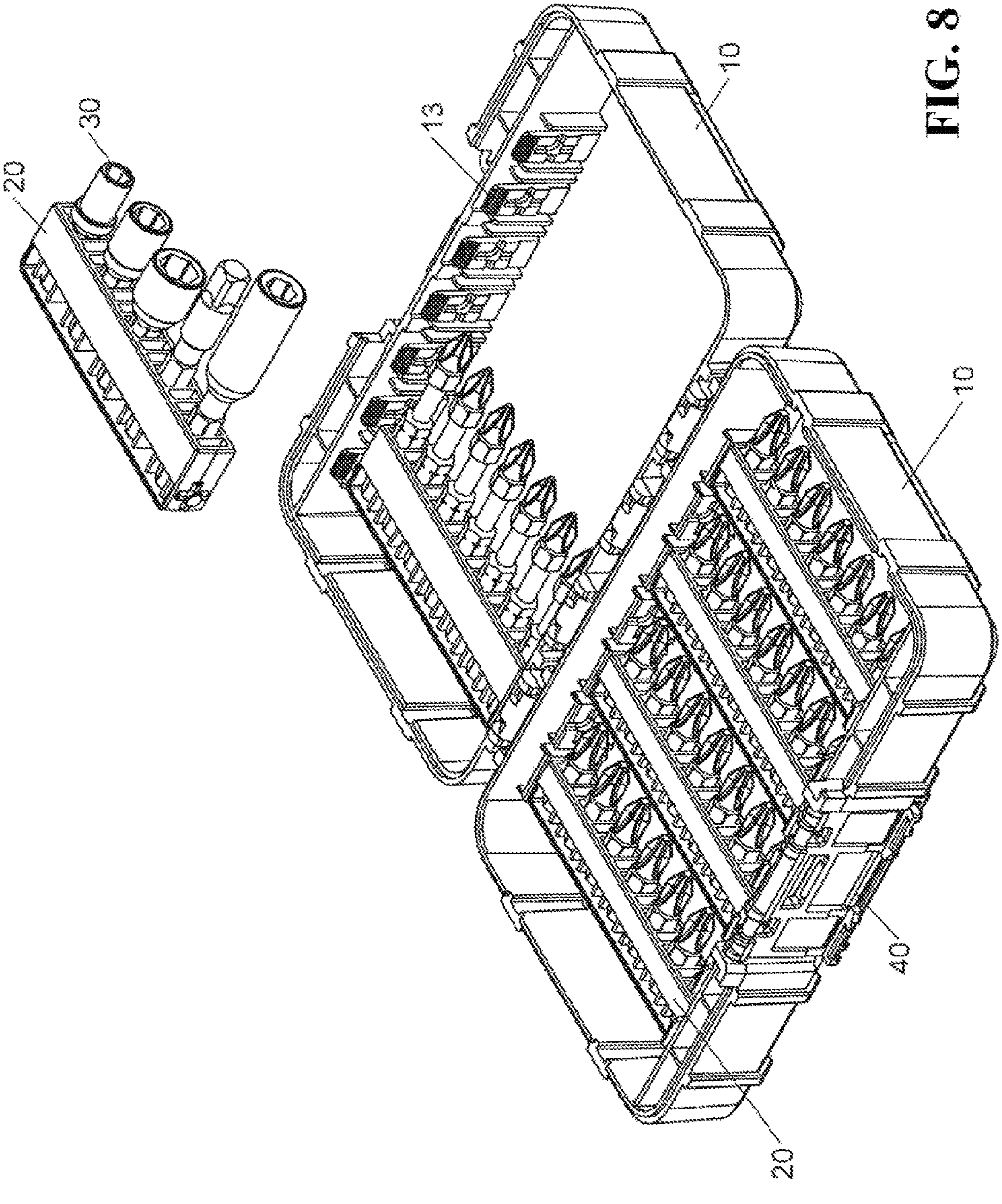
FIG. 8 is a second operational view of the tool box assembly as shown in FIG. 6.

In addition, when the press portion 134 is pressed, each of the locking elements 13 is slightly deformed and deflected and is rotated about the connecting portion 133, so that the third pivot portion 21 of at least one of the two sides of the at least one tool holder 20 is detached from the second pivot portion 131 of one of the locking elements 13, and the at least one tool holder is detached from the receiving space 11 as shown in FIG. 8. Thus, the at least one tool holder 20 and the hand tools 30 are used individually. When the press portion 134 is pressed again, the third pivot portion 21 of at least one of the two sides of the at least one tool holder 20 is mounted on the second pivot portion 131 of one of the locking elements 13, and the at least one tool holder is mounted in the receiving space 11 again as shown in FIG. 6.

In the preferred embodiment of the present invention, the tool box assembly comprises two cases 10. The first pivot portions 12 of the two cases are connected pivotally so that the two cases 10 are connected pivotally. Each of the two cases 10 is provided with a first snap-fit portion 14. The first snap-fit portion 14 is located opposite to the first pivot portion 12. The first snap-fit portion 14 is an elongate lug. The tool box assembly further comprises a switch member 40 provided with a fourth pivot portion 41 pivotally mounted on one of the two cases 10. The switch member 40 is provided with a second snap-fit portion 42 locked on the first snap-fit portion 14 of the other one of the two cases 10 so that the two cases 10 are closed and cannot be opened.

In the preferred embodiment of the present invention, the at least one case 10 is provided with multiple support elements 136. Two of the support elements 136 are arranged symmetrically at two sides of each of the locking elements 13. The support elements 136 are disconnected with and spaced from the locking elements 13.

Figure 2:
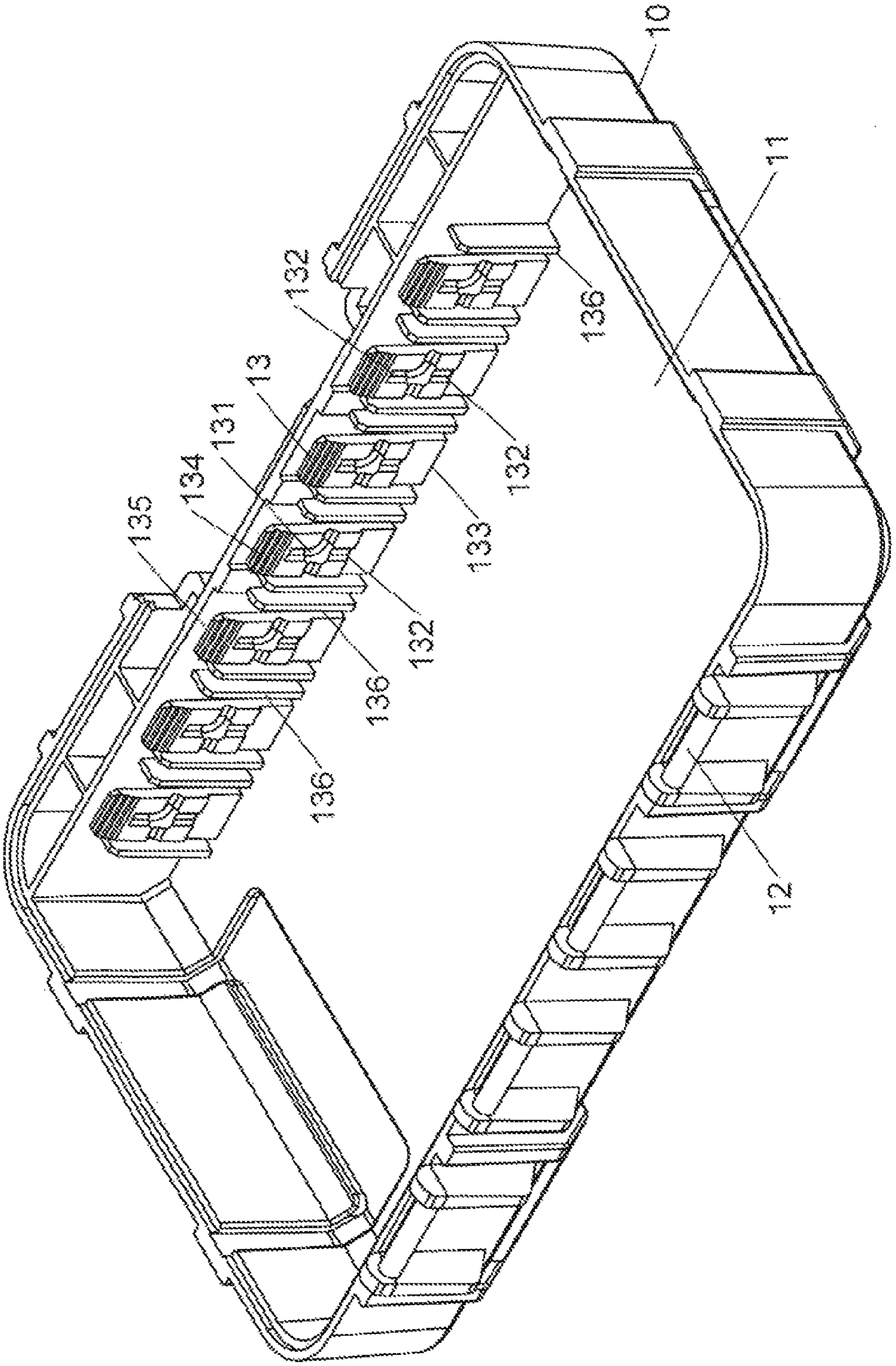
FIG. 2 is a perspective view of a case of the tool box assembly in accordance with the preferred embodiment of the present invention.
Figure 3:
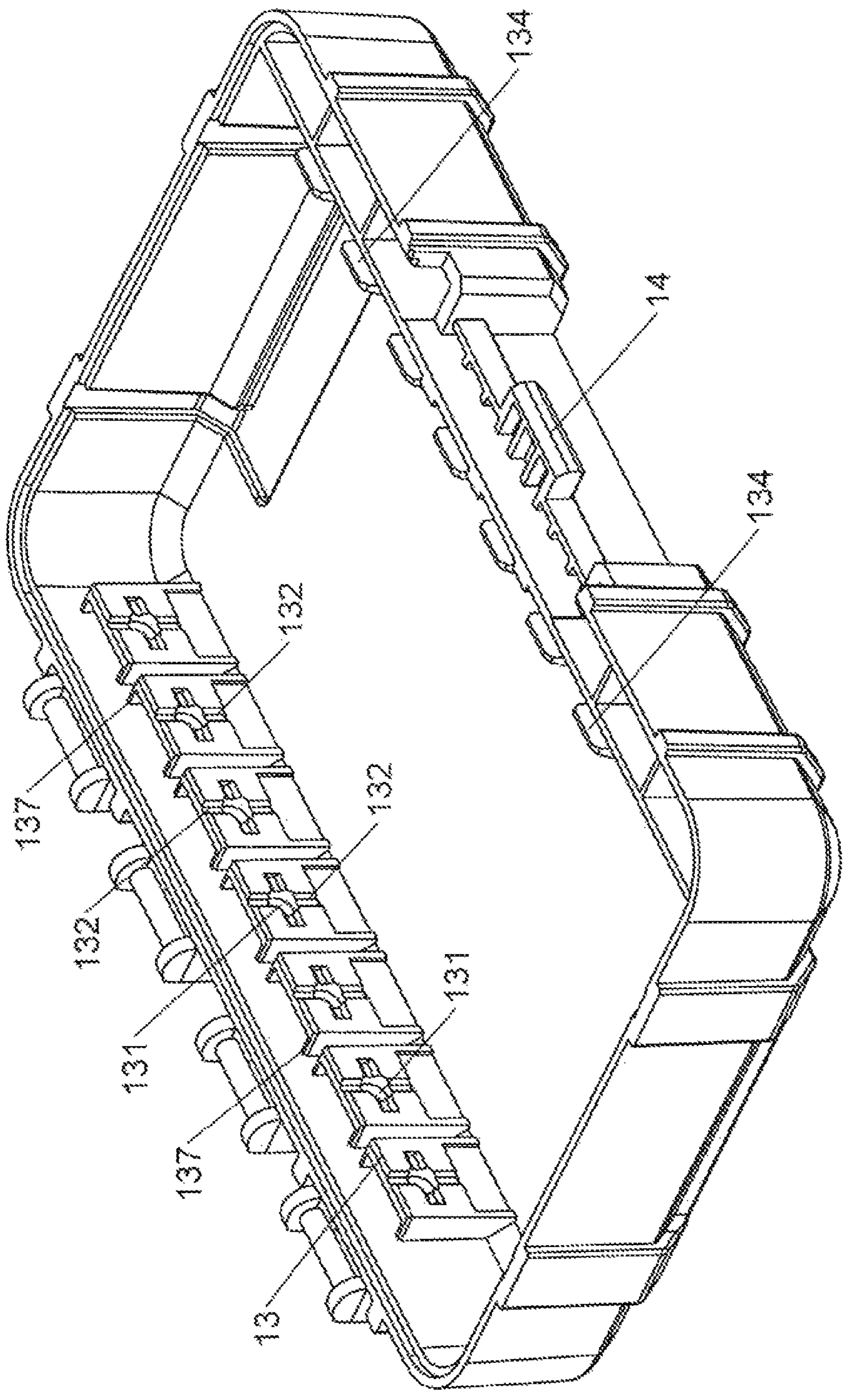
FIG. 3 is another perspective view of the case of the tool box assembly in accordance with the preferred embodiment of the present invention.

In the preferred embodiment of the present invention, each of the locking elements 13 at one of the two sides of the receiving space 11 is provided with the press portion 134 as shown in FIG. 2, and each of the locking elements 13 at the other one of the two sides of the receiving space 11 is provided with two fixed portions 137 secured to the at least one case 10 as shown in FIG. 3. Thus, the press portion 134 of each of the locking elements 13 at one of the two sides of the receiving space 11 is pressed by the user, and each of the locking elements 13 at the other one of the two sides of the receiving space 11 is fixed.

In the preferred embodiment of the present invention, each of the receiving grooves 23 has a rectangular shape, a square shape, a hexagonal shape or a circular shape. The receiving grooves 23 are arranged linearly in a lengthwise direction of the at least one tool holder 20. Each of the receiving grooves 23 has a bottom provided with an opening 24. The opening 24 is connected to each of the receiving grooves 23.

In operation, referring to FIGS. 6-8 with reference to FIGS. 1-5, the at least one tool holder 20 and the hand tools 30 are placed in the receiving space 11 of the at least one case 10. When the at least one tool holder 20 is positioned at the first position as shown in FIG. 6, the hand tools 30 are arranged transversely in the receiving space 11. When the at least one tool holder 20 and the hand tools 30 are rotated relative to the at least one case 10, the at least one tool holder 20 is positioned at the second position as shown in FIG. 7, and the hand tools 30 are arranged upright in the receiving space 11, so that the hand tools 30 protrude from the at least one case 10 to facilitate the user taking the hand tools 30 from the at least one tool holder 20. When the press portion 134 is pressed, each of the locking elements 13 is rotated about the connecting portion 133, so that the third pivot portion 21 of at least one of the two sides of the at least one tool holder 20 is detached from the second pivot portion 131 of one of the locking elements 13, and the at least one tool holder 20 is detached from the receiving space 11 as shown in FIG. 8. Thus, the at least one tool holder 20 and the hand tools 30 are used individually.

Figure 9:
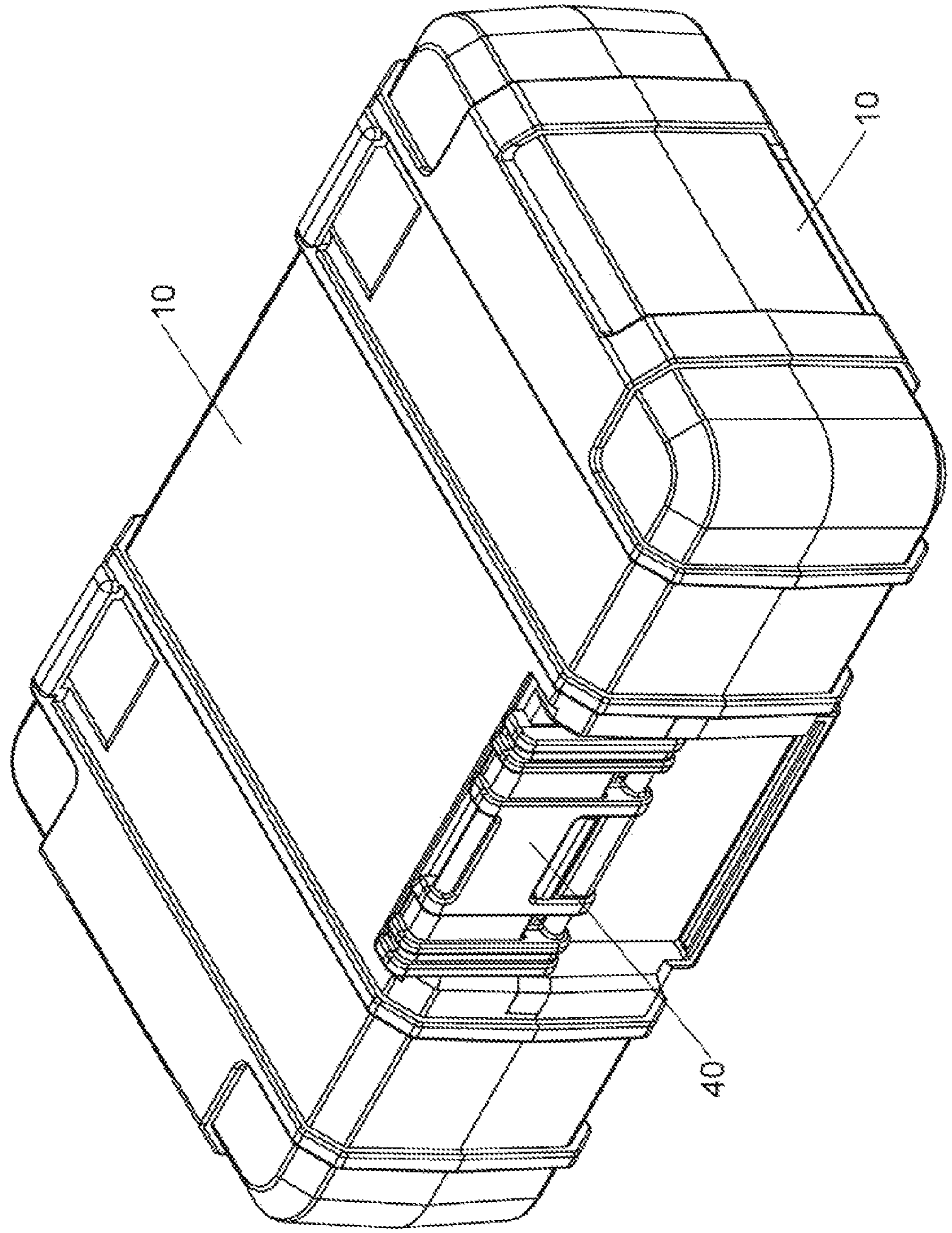
FIG. 9 is a third operational view of the tool box assembly as shown in FIG. 6.

Referring to FIG. 9 with reference to FIGS. 1-5, when the two cases are closed, the second snap-fit portion 42 is locked on the first snap-fit portion 14.

Figure 10:
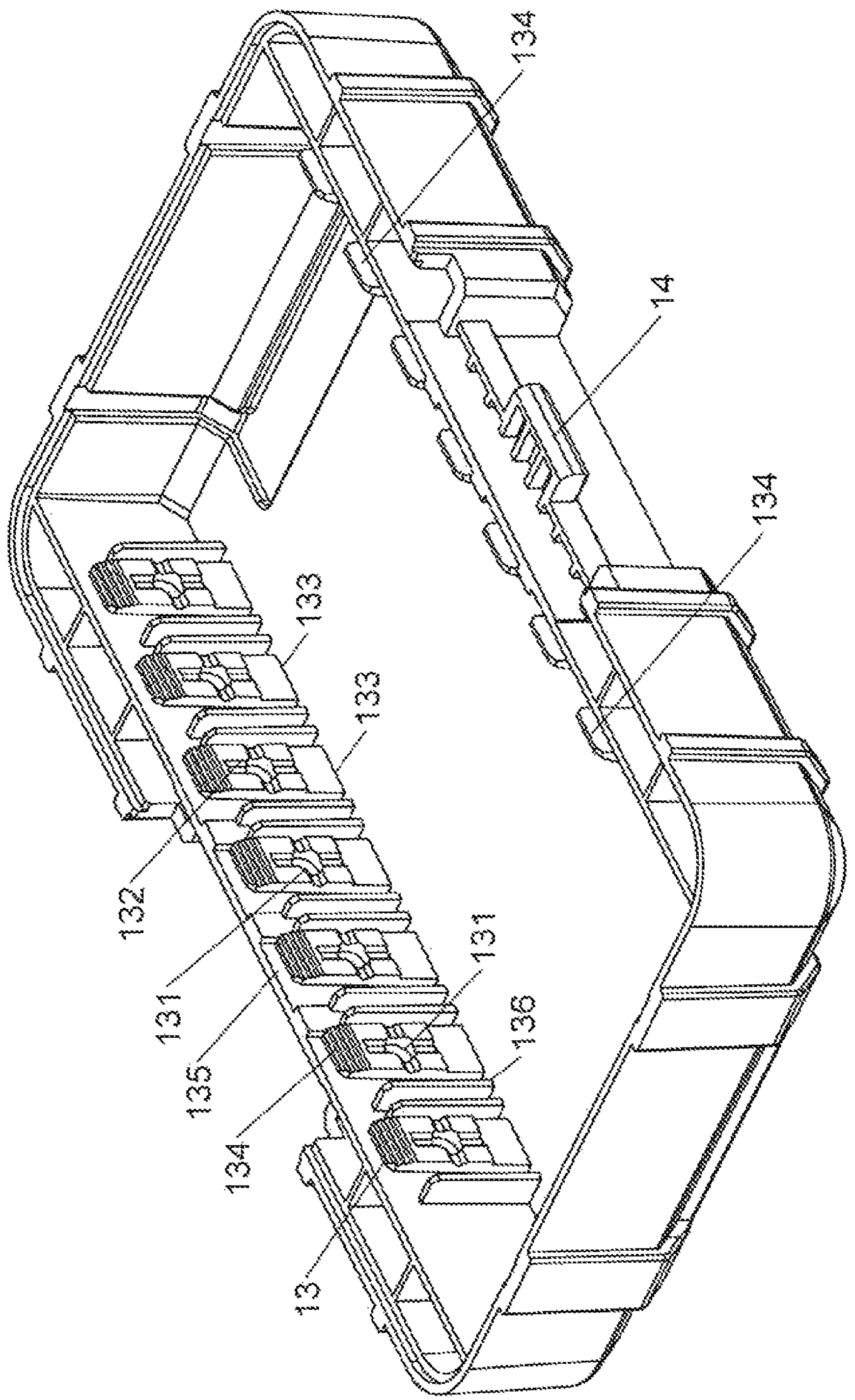
FIG. 10 is a perspective view of a case of the tool box assembly in accordance with a second preferred embodiment of the present invention.
Figure 11:
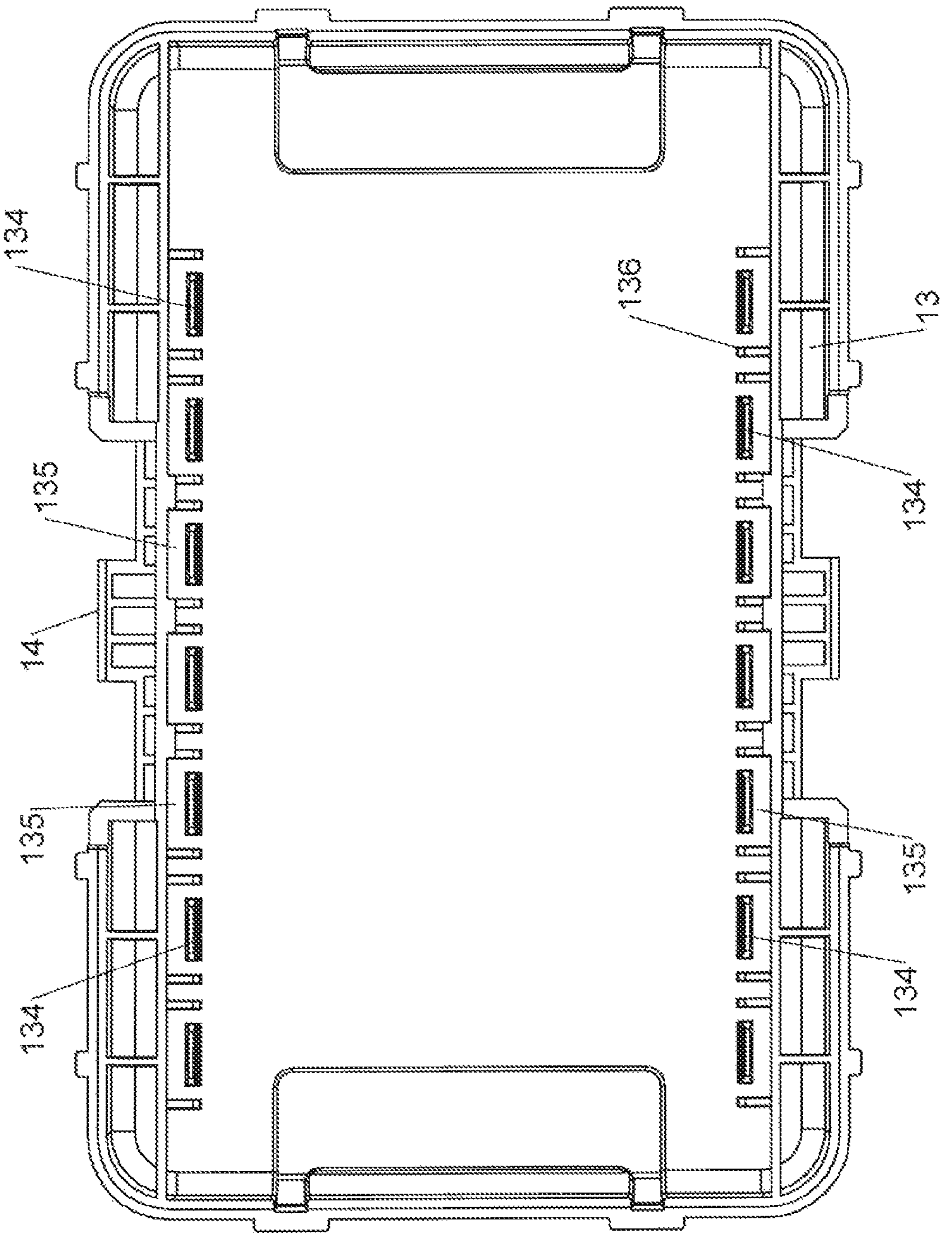
FIG. 11 is a top view of the case of the tool box assembly as shown in FIG. 10.

Referring to FIGS. 10 and 11 with reference to FIGS. 1-5, each of the locking elements 13 at the two sides of the receiving space 11 is provided with the press portion 134. Thus, the press portion 134 of each of the locking elements 13 at the two sides of the receiving space 11 is pressed by the user, so that the at least one tool holder 20 and the hand tools 30 are detached from the receiving space 11.

Figure 12:
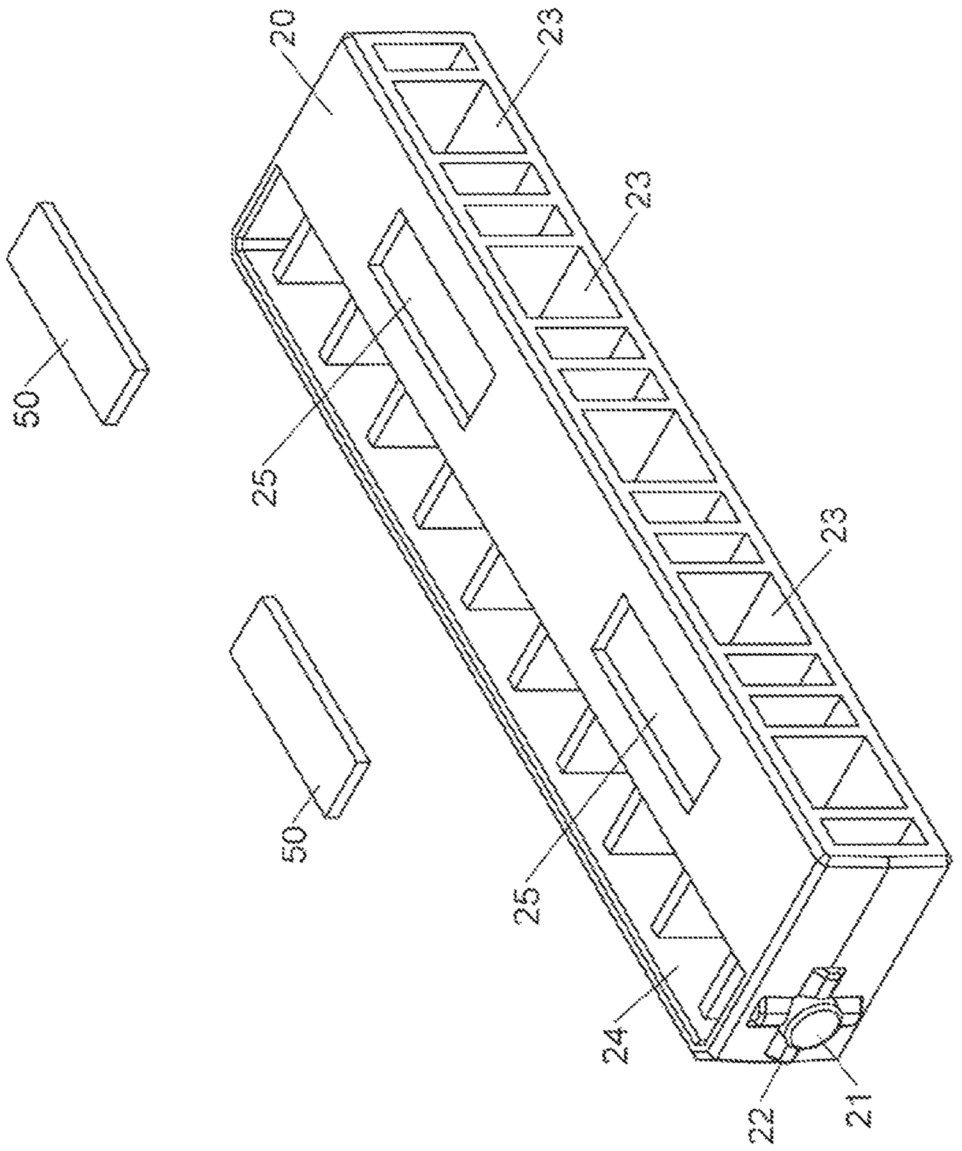
FIG. 12 is an exploded perspective view of a tool holder of the tool box assembly in accordance with the third preferred embodiment of the present invention.
Figure 13:
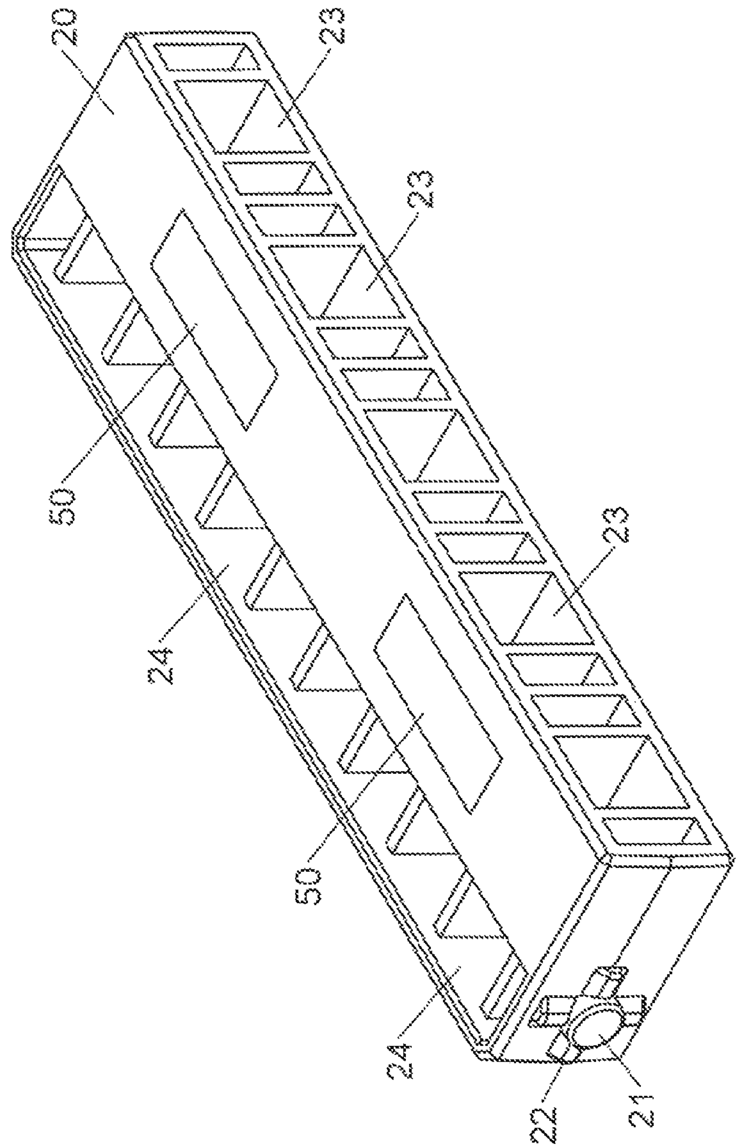
FIG. 13 is a perspective assembly view of the tool holder of the tool box assembly as shown in FIG. 12.

Referring to FIGS. 12 and 13 with reference to FIGS. 1-5, the at least one tool holder 20 has a face provided with at least one magnet slot 25, and at least one magnet 50 is mounted in the at least one magnet slot 25. The at least one magnet slot 25 has a rectangular shape. The at least one magnet 50 has a face coplanar (or flush) with the face of the at least one tool holder 20. Alternatively, the at least one magnet 50 protrudes from the at least one magnet slot 25 of the at least one tool holder 20. Thus, when the at least one tool holder is unlocked from of one of the locking elements 13, the at least one tool holder 20 is attached to an object (such as a car a tool cart or the like) by the at least one magnet 50.

Figure 4:
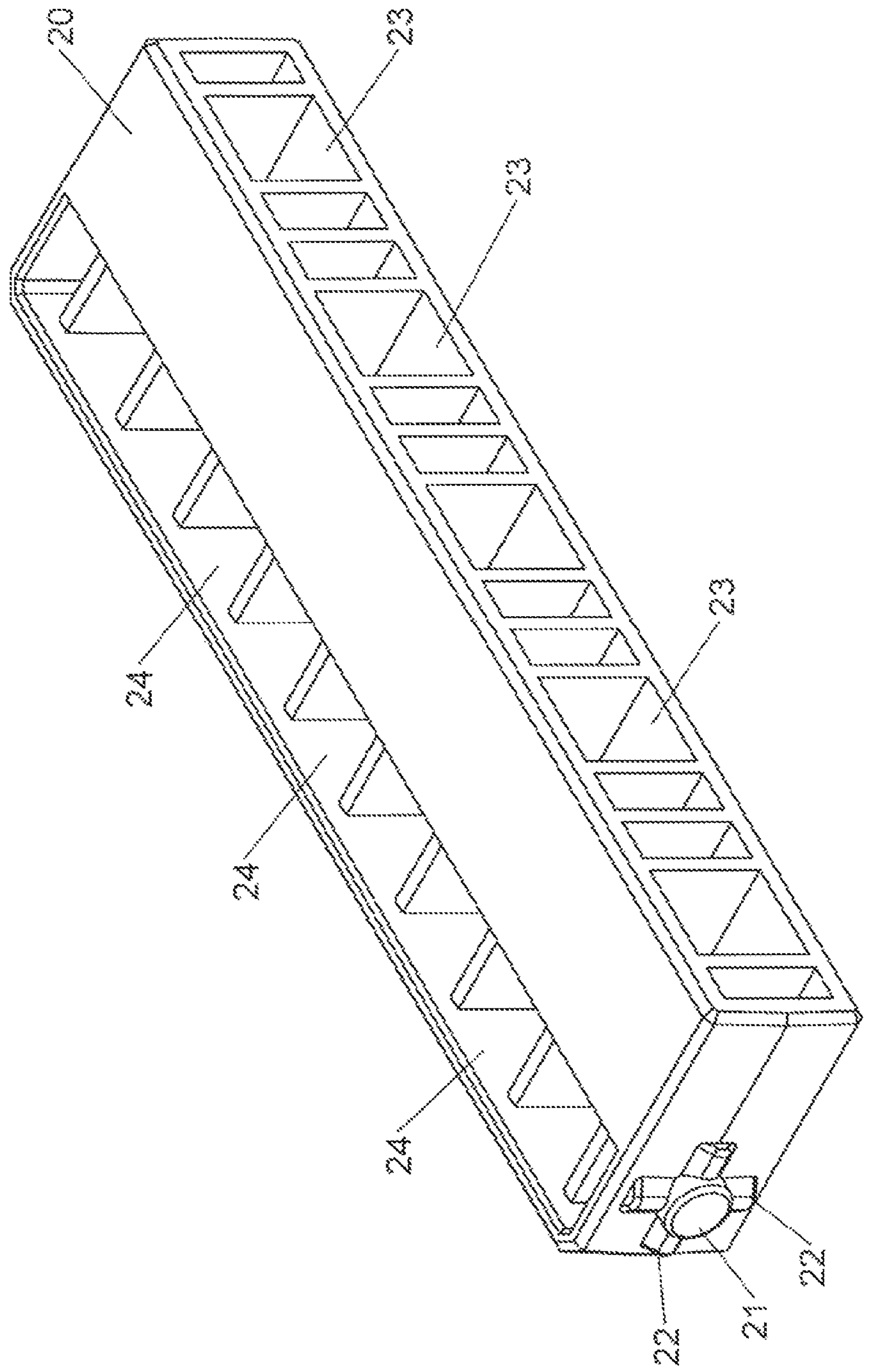
FIG. 4 is a perspective view of a tool holder of the tool box assembly in accordance with the preferred embodiment of the present invention.
Figure 5:
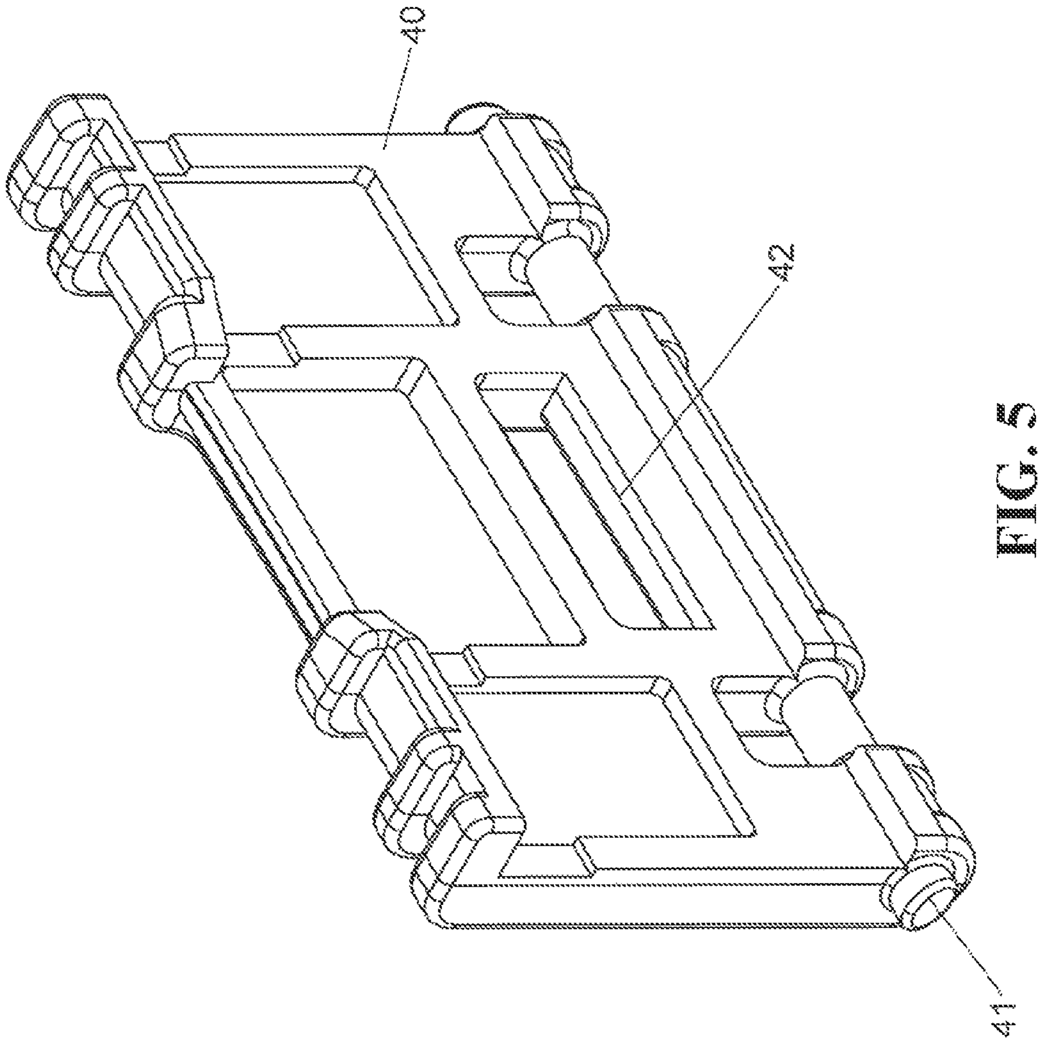
FIG. 5 is a perspective view of a switch member of the tool box assembly in accordance with the preferred embodiment of the present invention.

As shown in FIGS. 2 and 4, each of the locking elements 13 has four first positioning portions 132, and each of the two sides of the at least one tool holder 20 has four second positioning portions 22 so that the at least one tool holder 20 is positioned at two locations. Alternatively, each of the locking elements 13 has six first positioning portions 132, and each of the two sides of the at least one tool holder 20 has six second positioning portions 22 so that the at least one tool holder 20 is positioned at three locations.

Accordingly, the tool box assembly of the present invention has the following advantages.

1. Each of the locking elements 13 is provided with a second pivot portion 131. The at least one tool holder 20 has two sides each of which is provided with a third pivot portion 21. The third pivot portion 21 is pivotally connected with the second pivot portion 131 so that the at least one tool holder is rotated relative to the locking elements 13. Thus, the locking elements 13 restrict the at least one tool holder 20 so that the at least one tool holder 20 will not be detached from the receiving space 11 easily.
2. The at least one tool holder 20 is unlocked from the locking elements 13 by pressing the press portion 134 so that the at least one tool holder 20 is detached from the receiving space 11 and can be used individually. Thus, the at least one tool holder 20 is rotated relative to the locking elements 13 and can be released from the at least one case 10 so that the at least one tool holder 20 has a double operation function.
3. The second positioning portions 22 are positioned on the first positioning portions 132 so that the at least one tool holder 20 is at least positioned at two positions when the at least one tool holder 20 is rotated relative to the locking elements 13.
4. When the press portion 134 is pressed, each of the locking elements 13 is slightly deformed and deflected and is rotated about the connecting portion 133, so that the third pivot portion 21 of at least one of the two sides of the at least one tool holder 20 is detached from the second pivot portion 131 of one of the locking elements 13, and the at least one tool holder is detached from the receiving space 11. Thus, the at least one tool holder 20 and the hand tools 30 are used individually. When the press portion 134 is pressed again, the third pivot portion 21 of at least one of the two sides of the at least one tool holder 20 is mounted on the second pivot portion 131 of one of the locking elements 13, and the at least one tool holder 20 is mounted in the receiving space 11 again.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A tool box assembly comprising:

at least one case;

at least one tool holder mounted in and rotated relative to the at least one case; and multiple hand tools mounted in the at least one tool holder;

wherein:

the at least one case has an interior provided with a receiving space;

the at least one case is provided with a first pivot portion;

the at least one case is provided with multiple locking elements located at two sides of the receiving space;

the locking elements at the two sides of the receiving space are arranged symmetrically;

the locking elements are arranged linearly in a longitudinal direction of the receiving space;

each of the locking elements is provided with a second pivot portion;

the second pivot portion is arranged at a middle position of each of the locking elements;

each of the locking elements is provided with multiple first positioning portions;

the first positioning portions are arranged annularly about an axis of the second pivot portion of each of the locking elements;

each of the locking elements has an L-shaped profile in cross section;

each of the locking elements is provided with a connecting portion connected with the at least one case;

the connecting portion connects each of the locking elements with the at least one case;

the connecting portion is arranged at a bottom of the receiving space;

each of the locking elements is provided with a press portion;

the second pivot portion and the first positioning portions are arranged between the press portion and the connecting portion;

the press portion is distant from the connecting portion;

a movable space is defined between the press portion and the at least one case to allow movement of the press portion when the press portion is pressed, so that each of the locking elements is deformed and rotated about the connecting portion;

the movable space has a width more than a length of the second pivot portion;

the second pivot portion is a circular hole or a groove;

each of the first positioning portions is a groove;

each of the first positioning portions is connected to the second pivot portion;

the second pivot portion has a depth more than that of each of the first positioning portions;

the first positioning portions and the second pivot portion construct a cross-shaped slot when each of the locking elements has four first positioning portions;

the at least one tool holder is mounted in the receiving space;

the at least one tool holder has two sides each of which is provided with a third pivot portion;

the third pivot portion is pivotally connected with the second pivot portion so that the at least one tool holder is rotated relative to the locking elements;

each of the two sides of the at least one tool holder is provided with multiple second positioning portions;

the second positioning portions are positioned on the first positioning portions so that the at least one tool holder is positioned on the locking elements when the at least one tool holder is rotated relative to the locking elements;

the second positioning portions are arranged annularly about an axis of the third pivot portion of the at least one tool holder;

the at least one tool holder is provided with multiple receiving grooves;

the third pivot portion is a circular boss or a projection;

each of the second positioning portions is a projection;

each of the second positioning portions is connected to the third pivot portion;

the third pivot portion has a height more than that of each of the second positioning portions;

the second positioning portions and the third pivot portion construct a cross-shaped projection when each of the two sides of the at least one tool holder has four second positioning portions;

the hand tools are mounted in the receiving grooves;

when the third pivot portion is pivoted relative to the second pivot portion, the at least one tool holder is positioned between a first position where the receiving grooves are directed toward a face of the receiving space, and the hand tools are arranged transversely in the receiving space, so that the at least one tool holder and the hand tools are stored in the receiving space of the at least one case, and a second position where the receiving grooves are directed toward an opening of the receiving space, and the hand tools are arranged upright in the receiving space;

when the press portion is pressed, each of the locking elements is slightly deformed and deflected and is rotated about the connecting portion, so that the third pivot portion of at least one of the two sides of the at least one tool holder is detached from the second pivot portion of one of the locking elements, and the at least one tool holder is detached from the receiving space;

the at least one tool holder and the hand tools are used individually; and when the press portion is pressed again, the third pivot portion of at least one of the two sides of the at least one tool holder is mounted on the second pivot portion of one of the locking elements, and the at least one tool holder is mounted in the receiving space again.

2. The tool box assembly as claimed in claim 1, wherein:

the tool box assembly comprises two cases;

the first pivot portions of the two cases are connected pivotally so that the two cases are connected pivotally;

each of the two cases is provided with a first snap-fit portion;

the first snap-fit portion is located opposite to the first pivot portion;

the first snap-fit portion is an elongate lug;

the tool box assembly further comprises a switch member provided with a fourth pivot portion pivotally mounted on one of the two cases; and the switch member is provided with a second snap-fit portion locked on the first snap-fit portion of the other one of the two cases so that the two cases are closed.

3. The tool box assembly as claimed in claim 1, wherein:

the at least one case is provided with multiple support elements;

two of the support elements are arranged symmetrically at two sides of each of the locking elements; and the support elements are disconnected with and spaced from the locking elements.

4. The tool box assembly as claimed in claim 1, wherein each of the locking elements at one of the two sides of the receiving space is provided with the press portion, and each of the locking elements at the other one of the two sides of the receiving space is provided with two fixed portions secured to the at least one case.

5. The tool box assembly as claimed in claim 1, wherein:

each of the receiving grooves has a rectangular shape, a square shape, a hexagonal shape or a circular shape;

the receiving grooves are arranged linearly in a lengthwise direction of the at least one tool holder;

each of the receiving grooves has a bottom provided with an opening; and the opening is connected to each of the receiving grooves.

6. The tool box assembly as claimed in claim 1, wherein:

the at least one tool holder has a face provided with at least one magnet slot;

at least one magnet is mounted in the at least one magnet slot;

the at least one magnet slot has a rectangular shape;

the at least one magnet has a face coplanar with the face of the at least one tool holder or the at least one magnet protrudes from the at least one magnet slot of the at least one tool holder; and when the at least one tool holder is unlocked from of one of the locking elements, the at least one tool holder is attached to an object by the at least one magnet.

* * * * *